United States Patent [19]
Holcombe et al.

[11] 3,744,628
[45] July 10, 1973

[54] CLASSIFYING METHOD AND APPARATUS

[75] Inventors: Edward L. Holcombe, Taylors; Philip L. Reid, Lyman; Robert S. Hawkins, Spartanburg, all of S.C.

[73] Assignee: W. R. Grace & Co., Duncan, S.C.

[22] Filed: Feb. 1, 1971

[21] Appl. No.: 111,249

[52] U.S. Cl. .............................................. 209/90
[51] Int. Cl. ............................................ B07c 5/06
[58] Field of Search........................ 209/82, 88, 90

[56] References Cited
UNITED STATES PATENTS
3,278,023  10/1966  Schneider........................... 209/88
1,354,251  9/1920  Heath................................. 209/90

Primary Examiner—Allen N. Knowles
Assistant Examiner—Gene A. Church
Attorney—John J. Toney, William D. Lee and Edward J. Hanson, Jr.

[57] ABSTRACT

A method of classifying poultry by measuring the back to keel bone distance thereof and indexing according to different measured distances using a deflectible paddle sensor deflected by the poultry moving thereunder on a conveyor and apparatus suitable for performing such method and including an air sequencing switch controlling two reversing air valves in response to the sensed deflection of the paddle to open a powered circuit for moving a classifying chute.

7 Claims, 4 Drawing Figures

CLASSIFYING METHOD AND APPARATUS

BACKGROUND OF THE INVENTION

This invention relates to classifying means and more particularly to classifying means particularly adaptable for classifying poultry for packaging.

The present invention is of particular value in providing a means for classifying poultry and the like in accordance with the size bag that will be required for receipt of the poultry in a bagging line.

In the past it has been the practice to weigh the poultry to determine which size bag should be used in semi-automatic packaging lines. It was previously known that with dressed poultry, making reasonable allowance for variation in girth, weight generally corresponded to girth with sufficient uniformity to allow indexing for bag size on a weight basis.

SUMMARY OF THE INVENTION

By an aspect of the invention a process is provided for expeditiously measuring the back to outer keel bone distance of poultry. The poultry is placed on its back on a moving conveyor and carried under a deflectible paddle sensor which moves over the keel bone area as the poultry passes thereunder. In the preferred form a first switch means is switched to a position corresponding to the sensed deflection of the paddle, opening power circuitry. The keel bone area of the poultry is engaged with a second deflection member carried by the paddle and the sensing of the deflection of this second member switches a second switch means powering the power circuitry operating an indexing means and indexing the poultry.

By another aspect of this invention apparatus is provided particularly adaptable for classifying poultry. The apparatus includes a conveyor and a paddle sensor partially obstructing the passage over the conveyor. An actuator slide member is connected to the paddle sensor. The actuator traverses a predetermined path and engages in sequence a plurality of pulse switches to control two reversing air valves which form the control setting portion of a power circuit.

A pulse switch is connected to one end of each of the two reversing air valves and two pulse switches are independently connected to the opposite ends of each of the reversing air valves. A deflection panel extends from the paddle sensor for engagement by the poultry after the paddle sensor has done its job. This deflection panel is connected to a third reversing air valve which it actuates to supply air through the power circuit. The air furnishes the power to adjust a classifying chute to the index position selected by the control setting in accordance with the measured back to keel bone dimension.

A deflection switch actuator is located in the channel of the diverter chute and connected to a pulse switch which when actuated reverses the third reversing air valve venting the power circuit as the poultry passes from the diverter chute. This venting actuator is actuated by being engaged in the diverter chute by the back of the poultry as its passes through the diverter chute.

Accordingly, it is an object of this invention to provide a new classifying means. It is a further object to provide a means for classifying poultry which is particularly adapted for use in a semi-automatic bagging operation such as that shown in U.S. Pat. Application Ser. No. 9,869, filed Feb. 9, 1970, now U.S. Pat. No. 3,628,302 inventor John T. Roberts, assigned to the same assignee as this application. A still further object of this invention is to provide a poultry classifier that is flexible in its classifying capabilities and operates in expeditious and inexpensive manner.

APPLICANT'S BEST MODE

Figure 1:
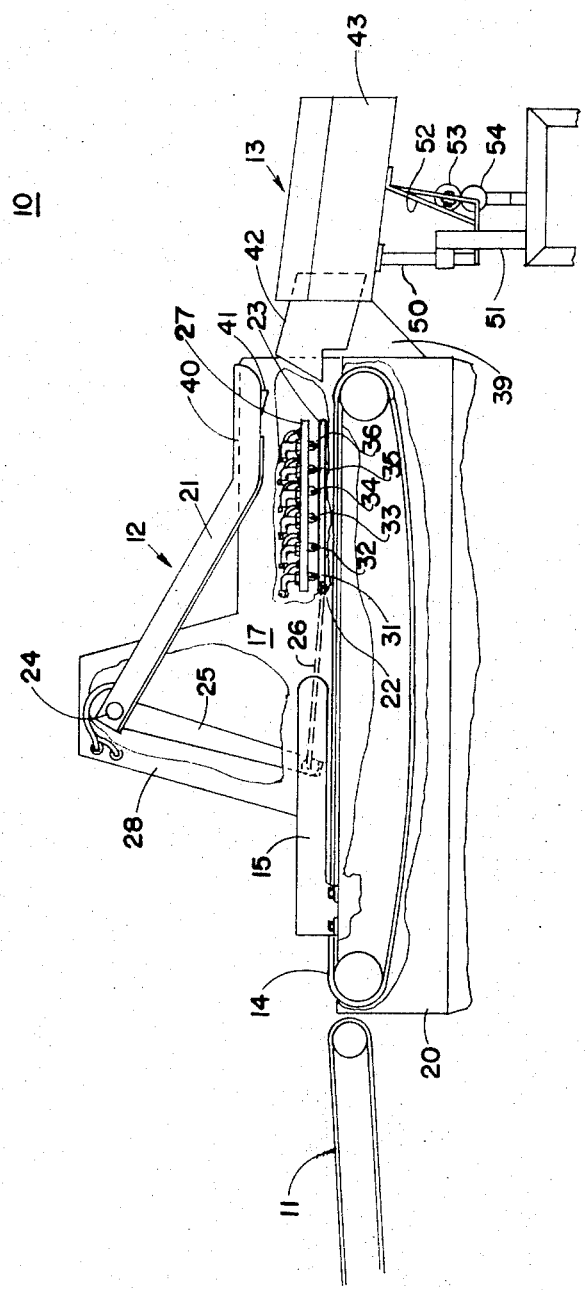
FIG. 1 is a diagrammatic representation in side elevation view with parts broken away and parts shown in phantom of the classifier of my invention.

Looking first at FIG. 1 an apparatus 10 particularly adapted for classifying poultry is shown having a feed-in conveyor 11, a classifying measuring means 12 and a diverter chute means 13. The feed-in conveyor 11 is inclined upwardly to the main conveyor 14 from a level below the main conveyor. The main conveyor's conveying speed is higher than the conveying speed of the feed-in conveyor to facilitate spacing out the products. In other words the main conveyor moves the product away more quickly than it is fed to the main conveyor. The main conveyor is a belt conveyor extending substantially the entire length of the classifying measuring means 12 of which it is a part. A guide having a pair of arms 15 and 16 (FIG. 2) is provided at the upstream end of the main conveyor. Each of the arms extends partially over and projects at an angle downstream across the conveyor from a respective side thereof forming a channel between them for the poultry product.

A paddle sensor mechanism 17 is mounted on the frame 20 of the classifying sensor means 12. The paddle sensor mechanism 17 has a paddle blade 21 which is set at an angle from the vertical and extends downwardly partially obstructing the passage over the main conveyor. The paddle member 21 has strengthening ribs 18a, 18b and 18c. The paddle sensor may be seen in FIG. 1 to be positioned downstream from the guide formed by the arms 15 and 16. A slide actuator 22 is secured in slide track 23 for traversing a predetermined path. The actuator 22 is connected to the paddle sensor 21 and in response to the movement of the paddle blade the actuator 22 traverses its predetermined path. The actuator connecting parts include a shaft 24 connected to the upper end of the paddle and extending perpendicularly from the side thereof, a crank arm 25 projecting perpendicularly from the shaft and a connecting rod 26 connecting the crank arm to the slide. A sequential air switch or position sensor 27 is positioned in the paddle sensor mechanism housing 28. The air sequencing switch 27 preferably has at least four pulse air switches 31, 32, 33 and 34 and more preferably six pulse air switches, including switches 35 and 36, for greater flexibility. The preferred pulse switch is a two way bleed-shift air valve. It may be seen in FIG. 1 that the switches have a plurality of switch actuators spaced along the path of the slide and actuated in sequence by engagement with the slide when it is moved along its path. It will be understood that while this is the preferred means for sensing and controlling the response to the distance of vertical deflection of the paddle blade other means may be advantageously provided in special situations.

An extension 40 on the downstream end of the paddle sensor 21 extends at an angle to the main body of the blade and substantially parallel to the surface of the main conveyor 14. A deflection plate 41 is secured in the downstream end or extension 40 of the paddle sensor 21 and extends or projects therebelow. The extension 40 extends down-stream from the paddle sensor. The deflection panel 41 forms a sensor in the extension.

The pivotal gravity feed diverter chute 13 is positioned downstream of the main conveyor and pivots between three index positions as indicated by the deflection position of the paddle sensor. An intermediate funnel chute 42 connects the conveying surface of the main belt 14 with the diverter chute 13 and provides smooth transfer of the product from the belt to the diverter chute. A support plate 39 supports the intermediate chute 42 from below.

Figure 3:
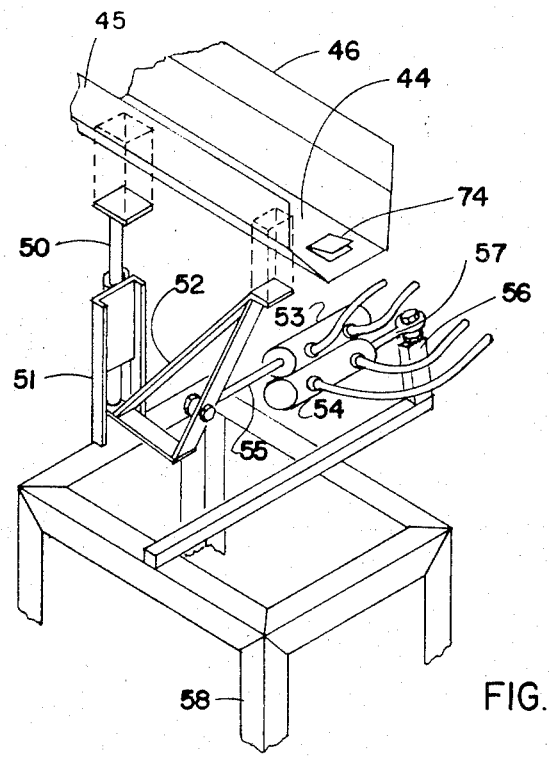
FIG. 3 is a diagrammatic representation in perspective view of the apparatus 13 of my invention.

The divertor chute means 13 includes a chute conveyor 43 which has a bottom 44 and sides 45 and 46 as shown in FIGS. 1 and 3. The gravity feed chute conveyor 43 is mounted on a rod 50 which is journaled in support 51 for pivoting movement between the plurality of three indexed positions which are selected in response to the deflection of the paddle sensor 21. A support arm 52 is secured between the conveyor chute 43 and the rod 50 as a strenthening member, supporting the conveyor 43 on the rod 50. The conveyor chute 43 is reciprocated by twin air cylinders 53 and 54 having positive in and out reciprocation air drive. The two air cylinders are bolted or connected together in reverse order as shown in FIGS. 1 and 3 to provide the desired three positions. Looking at FIG. 3, to reciprocate the conveyor 43 wholly to the right looking upstream the pistons in both cylinders would be retracted, to reciprocate the conveyor 43 to the intermediate or middle position one of the pistons would be activated to extend the piston rod and to move the conveyor 43 to the left both piston rods would be extended. It may be seen that air cylinder 53 is tied to support arm 52 through its piston rod 55 and that air cylinder 54 is connected to a retaining support 56 by its rod 57. The entire diverter means 13 includes a stand 58 which may be bolted to the frame 20 of the classifying sensor means 12 to hold them in working position.

Turning now to the control of the diverter means 13 by the classifying sensor means 12, the sequential switch 26 controls two reversing air valves 60 and 61 (FIG. 4) which in turn control the positioning of the cylinders 53 and 54 which as may be seen in FIG. 3 control the diverter conveyor 43. The preferred air valve is a double air piloted four-way air valve. As may be seen, looking at FIG. 4 only three of the pulse switches in this case switches 31, 32 and 33 of the stepping switch 26 are connected to the two reversing air valves 60 and 61. This provides three different combinations of position sequencing in the two reversing air valves and thereby three combinations of positions in the power means or piston cylinders 53 and 54 for powering the positioning of the diverter chute 43. The air line connections are made as shown diagrammatically in FIG. 4 with air line or conduit 62 extending from the pulse switch 31 and branching to open the valves 60 and 61 to air lines 63 and 64 respectively which would result in the extension of both piston rods 55 and 57.

If pulse switch 32 is then actuated selectively by actuator 22 a pulse of air passes through air line 65 reversing valve 61 closing line 64 to the cylinder 54 and opening line 66 to the cylinder 54. If the actuator 22 progresses further and actuates the pulse switch 33 a pulse of air passes through air line 67 reversing valve 60, closing air line 63 and opening air line 68 to the cylinder 53. Thus the means controlled by the actuator includes two reversing air valves and means responsively connected to the actuator positioning each of the reversing air valves to one position in response to one movement of the actuator, shifting only one of the reversing air valves in response to another movement of the actuator and shifting only the other reversing air valves in response to still another movement of the actuator. This gives three responses, both valves in one position, one valve reversed and the second valve reversed.

At this stage the pulse switch 69 which is mounted on the paddle 21 would be actuated in response to the deflection of panel member 41 (FIGS. 1 and 2) sending a pulse of air through line 70 positioning a third reversing air switch means 71 opening the valve to the in air line 72 which is connected to a 20 – 30 psi air source (not shown). Air line 77 (FIG. 4) feeds air to the pulse switch 69. The air flows through the valve 69 and through line 73 which branches supplying air to both of the two air reversing valves 60 and 61 and through them into the respective lines depending on the position of the reversing air valves to position the pistons 55 and 57. Thus the pistons are positioned as indicated by the movement of actuator 22. The pulse switches operate at 60 psi and are suitably connedted to an air supply by fittings not shown.

A deflection plate sensor 74 is carried by the chute conveyor 43 and projects above the lower surface or bottom 44 thereof and is actuated by the passage of an item through the chute channel signalling the approximate exit of a product from the chute. An air venting switch 75 is actuated by the deflection plate 74 (FIG. 3) and supplies a pulse of air through line 76 to the third reversing air valve 71 reversing its control position and shutting off the air from line 72 and venting the line 73 and the connections all the way to the cylinders 53 and 54. Thus the classifying apparatus is cleared for a subsequent classifying operation. The venting of the pressure from the two reversing valves 61 and 60 and the cylinders 53 and 54 permits the easy resetting of the valves 60, 61 by the sequential switch 26.

Figure 2:
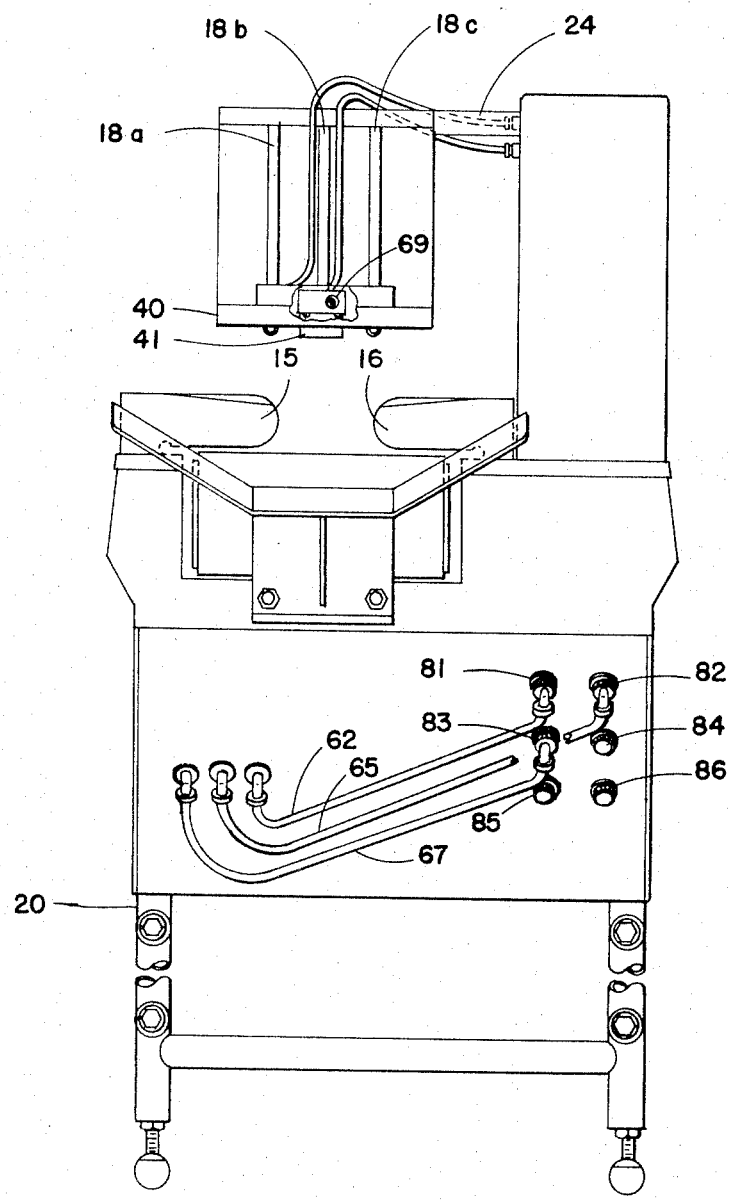
FIG. 2 is a diagrammatic representation in front elevation of the apparatus 12 of my invention.
Figure 4:
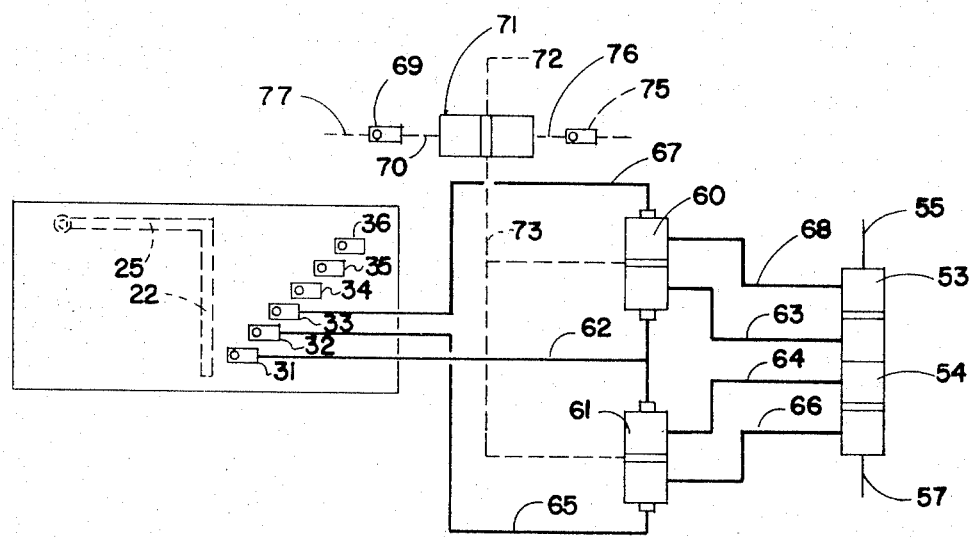
FIG. 4 is simplified plumbing diagram showing the operating air lines of my invention.

As may be seen looking at FIGS. 1, 2 and 4, as the paddle is raised to greater heights by a product passing under it the actuator 22 advances beyond switch 33 to pulse switch 34 and at higher levels to pulse switch 35 and at still higher levels to pulse switch 36. However, the diverter chute is only capable of indexing to three positions and therefore only three categories can be set on the particular embodiment shown. It will be seen that the classification fitting each category can be varied by moving the air lines 62, 65 and 67 from fittings 81, 82 and 83 to any other combination of fittings as may be desired. It will be understood that fitting 81 is connected to pulse switch 31, fitting 82 to pulse switch 32, fitting 83 to pulse switch 33, fitting 84 to pulse switch 34, fitting 85 to pulse switch 35, and fitting 86 to pulse switch 36. An example of an alternate classification would be, leave air line 62 on fitting 81 move air line 65 to fitting 83 and air line 67 to fitting 85. Thus each effective sensed height would be twice as far apart. It will be further understood that where close classification is desired but the items are larger than those that are to be indexed by the setting shown in FIG. 2 the air lines may be shifted so that line 62 is engaged on fitting 84, 65 is engaged on fitting 85 and 67 is engaged on fitting 86. The provision of flexibility in classifying items of varying bulk through the mere movement of the air lines 62 65 and 66 enables relatively unskill labor to change the set up with ease. Of course, connections for the other air lines shown in the diagram of FIG. 4 will also be present on the equipment 10 and as a matter of fact even the fittings shown in FIG. 2 may be placed elsewhere on the equipment.

OPERATION

In operation this invention is particularly directed to classifying dressed poultry products and the like and involves an operator placing the poultry on its back with its tail end downstream on the first feed in conveyor, conveyor 11, which feeds the poultry upwardly where it automatically passes to the main conveyor 14. The poultry passes through the guides 15 and 16 which assure its proper positioning for firm engagement of its keel bone area with the deflectible member, paddle 21. The poultry passes under the deflectible member which it deflects by pushing the member outwardly. As the member is moved it rides up over the keel bone area. This deflection is sensed by the paddle member 21 and the poultry is classified by switching a first switch means to a selected dispensing position indicated by and corresponding to the sensed deflection of the deflectible member and opening a power circuit. This is done as previously described by moving the actuator 22 in a predetermined path that corresponds with the movement of the paddle sensor 21 and engaging a plurality of pulse switches which position two reversing air valves opening the power circuit.

As the poultry is conveyed further down the main conveyor the keel bone area engages a second deflection member carried by the first deflectible member and deflects the second member as it is conveyed thereunder. The deflection of the second member is sensed and a second switch means is switched in response to the sensing. This powers the power circuit and operates the indexing means to index the poultry in accordance with its back to outer keel bone dimension by positioning the classifying chute which is downstream of and in communication with the conveyor. This is accomplished by the deflectible member 19 actuating a pulse switch 69 which opens the reversing air valve 71 to power the powered circuit and position the chute conveyor 43 by driving the pistons 53 and 54.

The poultry passes from the conveyor 14 to the conveying funnel means 42 which directs it into the indexed chute conveyor which functions to index and distribute the poultry. Typically the poultry is then bagged in an appropriately sized bag.

As the poultry passes through the chute conveyor 43 it's back engages a third deflection member 74 and deflects this third member as it passes over it. The deflection of this third member is sensed and in response thereto a pulse switch in the second switching means switches the third reversing valve 71 shutting off the power and venting the reversing air valves 60 and 61 and thereby the cylinders 53 and 54 as previously described. The poultry is moved through the chute to index it.

I claim:
1. A method of classifying poultry comprising: measuring the keel bone area height of said poultry by deflecting a deflectible member by moving the member over the keel bone area of said poultry passing thereunder; sensing the deflection of said member; positioning a classifying chute in a selected dispensing position responsive to the sensed deflection; and moving said poultry through said chute.

2. A method of classifying poultry comprising:
a. passing poultry under a deflectible member,
b. deflecting said deflectible member responsive to the height of said keel bone area,
c. sensing the amount of said deflection,
d. switching a first switch means to a position corresponding to said sensed deflection and thereby opening power circuitry,
e. engaging the keel bone area of the poultry with a second deflection member carried by said first deflectible member,
f. deflecting said second deflection member responsive to the height of said keel bone area,
g. sensing the amount of deflection of said second deflection member and switching a second switch means in response to said sensing and thereby providing power to said power circuitry,
h. positioning a classifying chute to receive the poultry, and
9.c moving said poultry through said chute. and traversing 3. The method of claim 2 wherein the poultry is dressed and positioned on its back with its tail end downstream and comprising engaging the back of the poultry with a third deflection member carried by said chute and deflecting said third member by passing said poultry thereover, sensing the deflection of said third member and switching said second switch means in response to said sensing and shutting the power off.

4. Apparatus for classifying products comprising:
a. a conveyor,
b. a paddle sensor partially obstructing the passage of product on said conveyor,
c. an actuator connected to said paddle sensor and traversing a predetermined path responsive to the movement of said paddle sensor,
d. diverter means at the downstream end of said conveyor for indexing said product,
e. control means for adjusting the position of said diverter means responsive to movement of said actuator,
f. an extension on said paddle sensor extending downstream therefrom,
g. a second sensor on said extension,
h. a power means for moving said diverter means,
i. and means responsively connected to said second sensor for powering said power means.

5. The apparatus of claim 14 wherein
j. said control means includes two reversing air valves,
k. means responsively connected to said actuator positioning each of said reversing air valves to one position in response to one movement of said actuator, shifting only one of said reversing air valves in response to another movement of said actuator and shifting only the other reversing air valve in response to still another movement of said actuator, to give three responses, both valves in one position, one valve reversed and the second valve reversed.

6. The apparatus of claim 5 wherein said actuator includes a slide track and a slide on said slide track, connecting means connecting said slide to said paddle sensor for moving said slide in response to the movement of said paddle; and said means responsively connected to said actuator and positioning said reversing air valves includes an air sequencing switch having a plurality of switch actuators spaced along the path of said slide and actuated in sequence by engagement with the slide when it is moved along its path, at least four pulse air switches in said sequencing switch, air conduits connecting selectively one of said pulse switches to one end of each of said reversing air valves and two of the other pulse switches independently to the opposite ends of each of said reversing air valves.

7. The apparatus of claim 5 wherein said apparatus include a feed in conveyor feeding said conveyor, said feed in conveyor feeding from a level below said conveyor and having a conveying speed less than the conveying speed of said conveyor; a guide at the upstream end of said conveyor, said guide including a pair of arms, each of said arms extending partially over and projecting at an angle downstream across said conveyor from a respective side thereof and forming a channel therebetween; said paddle sensor has a blade set at an angle from the vertical and extending downstream to partially obstructing the passage over said conveyor, said paddle sensor positioned downstream from said guide; said actuator including a shaft connected to the upper end of said paddle and extending perpendicularly from the side thereof, a crank arm projecting perpendicularly from said shaft, a connecting rod connecting said crank arm to said slide for moving said slide in response to the movement of said paddle; a pivotal gravity feed diverter chute downstream of said conveyor pivoting to one of three positions according to the positioning of said two valves by said sequencing switch; a third reversing air valve for supplying air to and venting said two reversing air valves; an extension on the downstream end of said paddle sensor extending at an angle to the main body of said blade and substantially parallel to the surface of said conveyor; a deflection panel in said downstream end of said paddle sensor and extending therebelow; a pulse air switch mounted on said paddle, connected to said third reversing air valve and actuated by said deflection panel to position said third reversing air valve and supply air to said two reversing air valves to position said pivotal gravity feed diverter chute; a pulse air venting switch in the channel of said diverter chute connected to said third reversing air valve and actuated by the passage of an item through said channel to position said third reversing air switch and vent said two reversing air valves.

* * * * *